United States Patent [19]

Honig et al.

[11] 4,249,493
[45] Feb. 10, 1981

[54] METHOD AND SYSTEM FOR GENERATING OPERATION-DEPENDENT CONTROL SIGNALS FOR APPARATUS, PARTICULARLY IGNITION AND FUEL INJECTIONS SYSTEMS FOR INTERNAL COMBUSTION ENGINES

[75] Inventors: Günter Honig, Markgromingen; Heinz Moller, Stuttgart, both of Fed. Rep. of Germany

[73] Assignee: Robert Bosch GmbH, Stuttgart, Fed. Rep. of Germany

[21] Appl. No.: 909,745

[22] Filed: May 26, 1978

[30] Foreign Application Priority Data

May 24, 1977 [DE] Fed. Rep. of Germany ....... 2723265

[51] Int. Cl.$^3$ .................................................. F02P 5/04
[52] U.S. Cl. .................................... 123/416; 123/418
[58] Field of Search ......... 123/117 D, 32 EB, 32 BC, 123/117 R

[56] References Cited

U.S. PATENT DOCUMENTS

| 3,915,131 | 10/1975 | Brungsberg | 123/117 R |
| 4,063,539 | 12/1977 | Gorille et al. | 123/117 D |

Primary Examiner—Ronald B. Cox
Attorney, Agent, or Firm—Frishauf, Holtz, Goodman & Woodward

[57] ABSTRACT

Data signifying the value of a controlled parameter which varies as a function of engine speed is stored on a disk rotating with an engine shaft. A sensor senses the data starting with a predetermined reference position and extending over a predetermined fixed scanning time. Since the time is fixed, the angle of rotation covered by the sensor will vary as a function of engine speed. The data is so arranged along the disk that the value of the parameter at the given speed can be determined from the sensed data at the end of the scanning time. The data is stored either as markings to be sensed serially from the start to the end of the scanning time, or is stored in parallel tracks to be sensed simultaneously at the end of the scanning time. For straight line approximations of the characteristic curve specifying the variation of the parameter as a function of speed, the disk has tooth-like segments indicating the required slopes, intervals for which the slopes are constant, and sign of the slopes by the length of the segments and/or the interval between segments.

22 Claims, 14 Drawing Figures

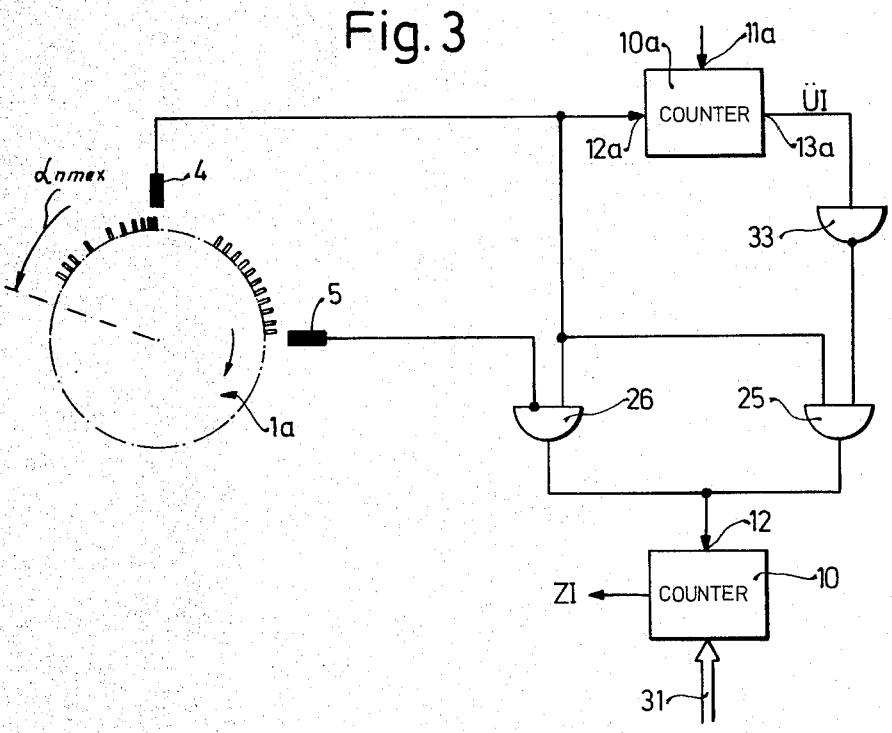
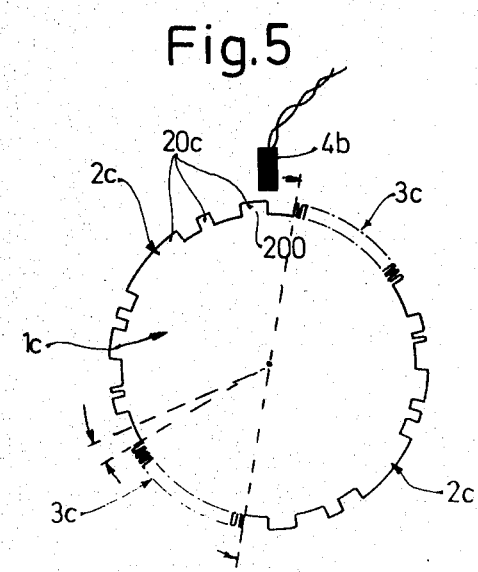

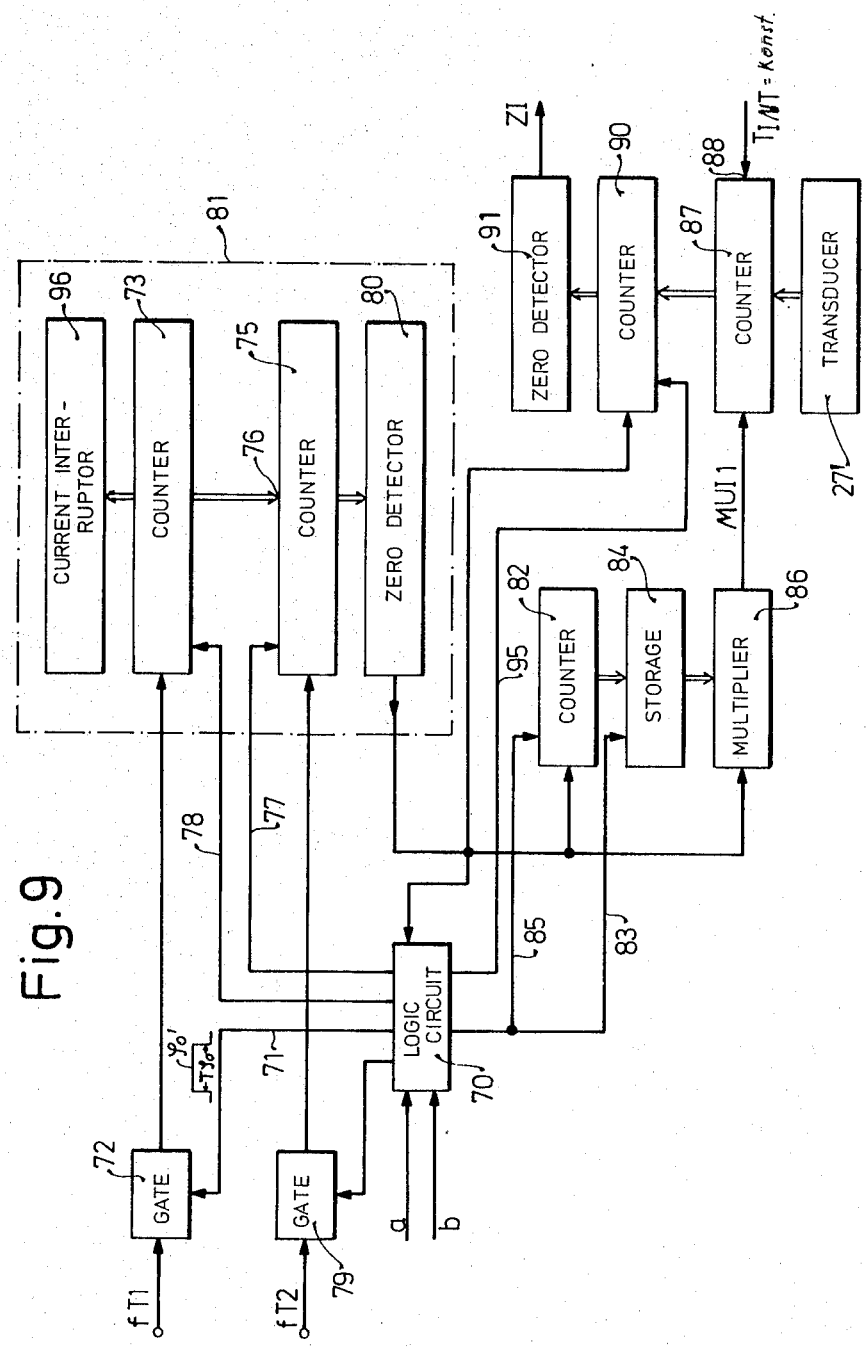

METHOD AND SYSTEM FOR GENERATING OPERATION-DEPENDENT CONTROL SIGNALS FOR APPARATUS, PARTICULARLY IGNITION AND FUEL INJECTIONS SYSTEMS FOR INTERNAL COMBUSTION ENGINES

The present invention relates to methods and systems for generating operation-dependent control signals, in particular in ignition control systems, fuel injection system, etc. in internal combustion engines. It is particularly applicable for generating speed-dependent control signals, although variations of other operating parameters such as temperature and load can be considered.

BACKGROUND AND PRIOR ART

A system for timing ignition signals which uses an electronic storage as well as a data carrier which rotates at engine speed and is sensed by a stationary sensor is disclosed in U.S. Pat. No. 4,063,539, Gorille et al., of which the inventors hereof are co-inventors, assigned to the assignee of the present application. In this system, the address of a particular storage location is derived in dependence on the then-present operating conditions. The contents of the storage are applied to a counter. Further scanning of the data carrier causes counting pulses, namely pulses each signifying the same incremental angle of rotation, to be applied to the counter until the counter reaches a predetermined count, at which time the ignition signal is furnished. The ignition time is thus automatically advanced at increasing engine speeds. Other parameters are taken into consideration by changing either the end count on the counter or causing the address of the storage location to be changed as a function of engine load, operating temperature, etc.

THE INVENTION

Briefly, in accordance with the present invention, the data carrier which rotates relative to the sensor at a speed corresponding to the engine speed, carries code markings which in themselves signify values of the controlled parameter at the then-present engine speed, if the data sensing means is operative only during a predetermined fixed scanning time during each rotation. This direct evaluation results in a greater equipment saving since the storages and the addressing means for the storages are eliminated.

In the simplest case, the value of the controlled parameter is stored in coded form in segments along the circumference of the disk, the number of segments counted during the scanning time signifying the value of the controlled parameter at the then-present speed. The counting pulses required causing the counter to count to the predetermined count at which the control signal is actually furnished is, in this embodiment, derived from segments spaced at equal angular increments along the circumference of the disk.

In another embodiment, the variation of the controlled parameter as a function of speed is approximated by straight line segments. The slope of the segments, and the speed range for which each slope remains constant are stored on the disk in the form of the regularly spaced segments whose length and/or keying ratios comprise the required information.

If the room on the data carrier occupied by the counting segments, that is the segments spaced at equal angular intervals to be saved, an embodiment of the invention utilizing a reference segment for creating a count on a reference counter which is inversely proportional to engine speed can be utilized. Counting down this count by a high frequency signal which has a constant pulse repetition rate with respect to time yields carry pulses which constitute counting pulses. More data can then be stored on the disk since the reference segment occupies a much smaller part of the circumference then would the counting segments.

DRAWINGS ILLUSTRATING PREFERRED EMBODIMENTS

FIG. 3 shows the same embodiment of the invention as FIG. 2, but with a counter for generating the timing signal determining the fixed scanning time;

FIG. 5 shows a data carrier having a data storage region with a plurality of parallel tracks;

FIG. 9 is a schematic diagram of the system for generating an ignition signal at an ignition angle signified by the data in the data storage of FIG. 8;

A mark carrier 1, 1a, 1b, etc. is provided in each embodiment. The marks on the mark carrier are so arranged that, upon scanning, data can be derived which varies as a function of the operating parameters and/or corresponds to stored values which can be utilized to compute a characteristic curve. The actual nature of the mark carrier is arbitrary. Any type of carrier can be used which moves synchronously to the engine in which it is installed and which carries the code marks which can be scanned by a appropriate sensor. The scanning can take place inductively, magnetically, optically, piezoelectrically or in any other appropriate manner. Disks, plates, tapes, hollow cylinders, etc. can be used as carriers and can be coupled to the crankshaft for rotation therewith. The movement of the carrier need, however, not be a rotating movement but can also be a translating movement. The movement can be derived from coupling to other shafts of the engine, for example, the cam shaft.

The scanned signals which, in the embodiments of the present invention, are pulse sequences, are evaluated for the most part on a digital basis. Any process within the internal combustion engine which must be regulated or controlled can be initiated and/or terminated on the basis of the derived pulse sequence. In the following preferred embodiments, the control of the ignition time in the engine is utilized as an example. The present invention is, however, not to be limited to such control and whether, since the basic principles of the invention can be utilized by one skilled in the art to control other processes as well.

A first preferred embodiment of the invention will be discussed with reference to FIGS. 2-4. The system shown in these figures is a digital system for controlling the ignition time. The marks on the mark carrier signify the values, in digital form, which are required to construct the characteristic curve.

Figure 1:
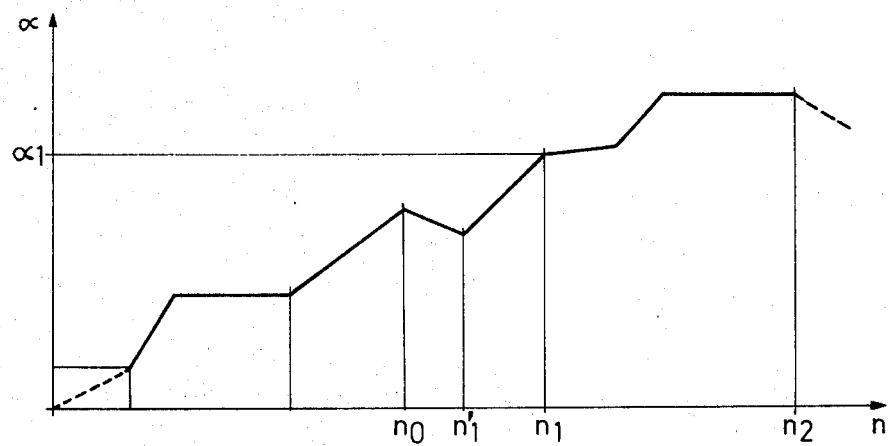
FIG. 1 shows a characteristic curve of ignition angle as a function of engine speed.

FIG. 1 shows a characteristic curve of the variation of the ignition angle $\alpha$ as a function of the rotational speed of the internal combustion engine. Other operating parameters of the engine as, for example, the load, or the temperature may affect the ignition angle within different speed ranges or throughout the whole speed range. These parameters are also taken into consideration, that is, the ignition angle is computed and the ignition initiated on the basis of characteristic curves such as FIG. 1, modified in accordance with the other operating parameters. For example, the ignition angle $\alpha$, corresponding to a given engine speed $n_1$ is computed and the ignition initiated at the moment at which the crankshaft is at the angular position relative to a reference point (for example the top dead center) which has been computed in accordance with the curve shown in FIG. 1. For all embodiments shown the mark carrier is illustrated as a disk which rotates with the crankshaft speed n and has teeth arranged around its circumference which are sensed by an inductive sensor and converted into a corresponding pulse sequence.

Figure 2:
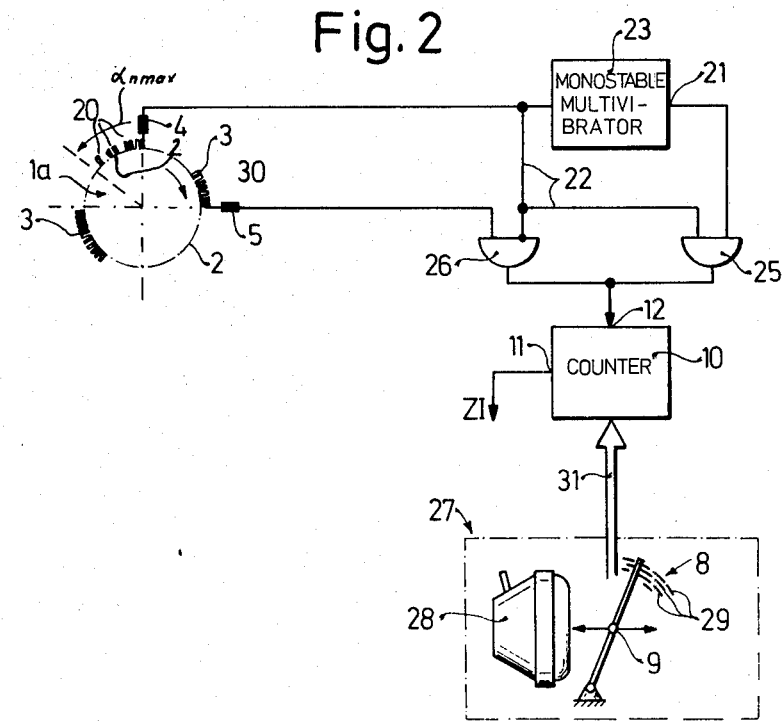
FIG. 2 shows an embodiment of the present invention utilizing a single disk having a data storage region and a counting pulse region.

In the embodiment in FIG. 2, the circumference of disk $1a$ is divided into a data storage region 2 and a counting pulse region 3. Two sensors 4 and 5 are provided for scanning data storage region 2 and the counting pulse region 3, respectively. Sensor 4 therefore furnishes a data pulse sequence while sensor 5 furnishes a counting pulse sequence, that is a sequence of pulses which occur at constant angular intervals. Teeth 30 which result in the counting pulse sequence therefore are distributed symmetrically around the circumference of disk $1a$, while the data storage region 2 contains teeth 20 which are spaced irregularly around the circumference as required to generate the data for reconstructing the characteristic curve.

In the embodiment being discussed, data storage region 2 contains data which will result in the reconstruction of the ignition angle vs. speed curve shown in FIG. 1. The sensed values according to other operating parameters are taken into consideration by other means, for example presetting of a counter to a value corresponding to the then-present value of the operating parameter.

The counter 10 shown in FIG. 2 has been preset as mentioned above. The data pulse sequence and the counting pulse sequence are applied to the counter until a predetermined limiting value has been reached. This limiting value can be zero or can represent a maximum counting value for the counter. When the limiting value is reached, a pulse is generated which initiates the particular process. In the embodiment shown in FIG. 2, an ignition pulse ZI is generated when the count on counter 10 reaches zero. The latter is determined by a zero detecting matrix such as, for example, a NOR gate connected to all outputs of counter 10.

The scanning of the data storage region 2 takes place for a predetermined fixed scanning time starting at the start of the data storage region, so that, depending upon the engine speed, a greater or lesser number of data pulses is applied to counter 10 during each rotation of the engine. The counting pulse sequence can be applied to counter 10 simultaneously with the data pulse sequence, if the counting pulses and the data pulses do not coincide in time. This can be achieved by suitable placing of the teeth in the data storage region relative to the teeth in the counting pulse region.

In FIG. 2, a monostable multivibrator 23 is connected to the output of sensor 4. The outputs of sensors 4 and 5 are connected through an AND gate 26 to the counting input 12 of counter 10. An AND gate 25 has a first input connected through a line 22 to the output of sensor 4, a second input connected through a line 21 to the output of monostable multivibrator 23 and an output connected to the counting input 12 of counter 10. An output 11 of counter 10 furnishes the ignition pulse. A plurality of lines 31 are connected to preset inputs of counter 10. The inputs of lines 31 are connected to an operating parameter sensor 27 which, in a preferred embodiment, furnishes a binary number indicative of an operating parameter. In FIG. 2 sensor 27 includes the vacuum box 28 to which is connected a scanning lever 9. The position of scanning lever 9 relative to a code wheel 8 changes as a function of pressure in the intake of the internal combustion engine, that is, as a function of engine load. The binary number corresponding to the position of lever 9 and derived from tracks 29 is used to preset counter 10 in accordance with the then-present load.

OPERATION

The first pulse at the output of sensor 4, that is the first pulse in the data pulse sequence, sets the monostable multivibrator 23. The first pulse must therefore have a higher amplitude or other characteristic value to differentiate it from other data pulses occurring after monostable multivibrator 23 has returned to its stable state. During the time that monostable multivibrator 23 is in the metastable state, a "1" signal appears on line 21. During this time, data pulses can pass through AND gate 25 to the counting input 12 of counter 10. Since the data pulses are applied to an inverting input of AND gate 26 while the counting pulse are applied to a direct input, counting pulses will be transmitted through AND gate 26 to input 12 of counter 10 in the absence of data pulses. After monostable multivibrator 23 has returned to its stable state, only counting pulses will be applied to counter 10. Since the characteristic curve shown in FIG. 1 is a full load characteristic curve, counter 10 has, as described above, been preset to a value which corresponds to the then-present engine load. Presetting in accordance with temperature and other operating parameters also takes place. When the count on counter 10 reaches a predetermined limiting value, ignition pulse ZI is generated.

If the characteristic curve includes only positive slopes, counter 10 need count in one direction only. For a characteristic curve as shown in FIG. 1, which has negative slopes, for example in the region from $n_0$ to $n'_1$, an up/down counter is required. Switching of the counting direction of counter 10 can be accomplished by shaping one of the teeth 20 or 30 in such a manner that the direction input of counter 10 responds only to the pulse generated by this tooth. Otherwise, a special sensor can be provided which scans a particular track which has sign information only. For example, pulses on the sign track can alternately set and reset a flip-flop. One output of the flip-flop is connected to the direction control input of counter 10. The embodiment of FIG. 3 is very similar to that of FIG. 2. However, monostable multivibrator 23 has been replaced by a counter 10a. Counter 10a is enabled by a pulse applied at an input 12a. This pulse is the first pulse generated by sensor 4, as described with reference to FIG. 2. After counter 10a has been enabled it counts clock pulses applied at a counting input 12a. The clock pulses have a predetermined fixed frequency, that is a predetermined number of clock pulses will define the time interval over which data pulses are to be applied to counter 10. After the predetermined number of clock pulses has been counted by counter 10a, it furnishes a carry pulses at output 13a. The carry pulse is inverted by an inverter 33 whose output is connected to the second input of AND gate 25. As soon as a carry pulse appears, AND gate 25 is blocked and no further data pulses will be applied to counting input 12 of counter 10.

For particularly simple characteristic curves, sensors 4 and 5 of FIGS. 2 and 3 can be replaced by a single sensor. The data storage region and the counting pulse region then follow one another along the circumference of the disk, or alternatively, teeth 20 and 30 are so spaced relative to each other that the counting pulses never coincide with the data pulses. In the embodiment of FIG. 4, a disk 1b rotates with the same rotational speed as the crankshaft. A data storage region 2a has a plurality of tracks 20a all of which are sensed simultaneously by sensor 4a. The outputs of sensor 4a are applied to a pulse former stage 35 whose outputs are connected to the inputs of an AND gate 41. AND gate 41 symbolizes a plurality of AND gates each receiving one of the outputs of pulse former 35. Second input of AND gate 41 is connected to the output of a monostable multivibrator 23a which is triggered by a predetermined output of a pulse former stage 42. The input of pulse former stage 42 is connected to the output of sensor 5a which senses the marks 30a in counting pulse region 3.

The output of monostable multivibrator 23a is connected to the inverting input of an AND gate 46 whose second input is connected to the output of pulse former stage 42. The output of monostable multivibrator 23a is also connected to the second input of AND gate(s) 41. The outputs of AND gate 41 are connected to the set inputs 47 of a first programmable counter 40. The carry pulse U1 generated by programable counter 40 when a predetermined count is reached, is applied to the set enable input of a second programmable counter 45. The preset inputs of counter 45 are connected through lines 31 to the output of operating parameter sensor 27. Counting inputs of counters 40 and 45 are connected to the output of AND gate 46.

OPERATION

Figure 4:
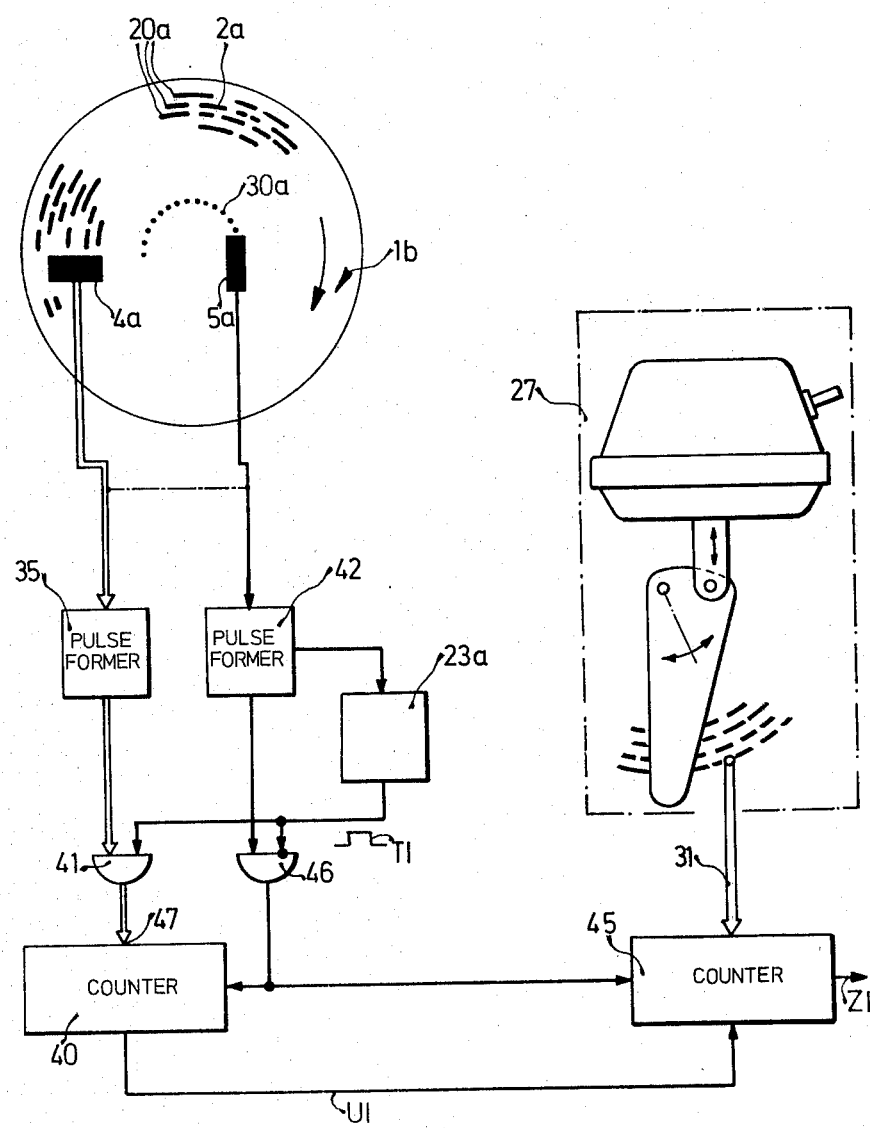
FIG. 4 shows an embodiment of the present invention utilizing a plurality of parallel tracks in the data storage region.

The main difference between the embodiment of FIG. 4 and those of FIGS. 2 and 3 lies in the fact that the data pulses signifying the stored data are generated in parallel, that is simultaneously, rather than in series. Each track 20a furnishes signals and all tracks are sensed simultaneously by sensor 4a. A first pulse of pulses 30a sensed by sensor 5a and formed by pulse former stage 42 sets monostable multivibrator 23a. Again, the predetermined fixed scanning time is set by the time constant of monostable multivibrator 23a. Since the output of monostable multivibrator 23a is applied to an inverting input of AND gate 46, AND gate 46 is blocked while monostable multivibrator 23a is in the metastable state. The input of AND gate 41 to which the output of monostable multivibrator 23a is connected is a differentiating input which responds to negative going pulse edges only. Therefore AND gate 41 becomes conductive at the end of the time interval fixed by monostable multivibrator 23a. Whatever binary number appears at the output of pulse former 35 at the time of the trailing edge of the output pulse of monostable multivibrator 23a is transfered to the preset input of counter 40. Counter 40 is thus preset to a number corresponding to the marks sensed by sensor 4a at the end of the predetermined fixed scanning time.

When monostable multivibrator 23a changes back to its stable state, AND gate 46 becomes conductive and pulses at the output of pulse former 42 are counted by programmable counter 40. When counter 40 reaches a predetermined count, a carry pulse U1 enables counter 45. Counter 45 is then set to a number corresponding to the output of operating parameter sensor 27. After this presetting, counter 45 also counts the counting pulses at the output of AND gate 46. When the count on counter 45 reaches a predetermined value, the ignition pulse ZI is generated.

The important thing about this embodiment is that counter 40 is preset to a binary number corresponding to data marks in a plurality of tracks sensed by sensor 4a at the end of the predetermined fixed scanning time.

The embodiment shown in FIG. 5 differs from the previous embodiments in that the coefficients for the characteristic curves which are to be generated are stored in the form of segments, holes, or other markings which have different lengths and are spaced at differing intervals. In FIG. 5 a disk 2c has segments along its circumference which have different length and are spaced at different distances from each other. The segments are sensed by an inductive sensor 4b. A data storage region is denoted by reference numeral 2c, a counting pulse region by reference numeral 3c. The signals furnished by sensor 4b are applied to the circuit shown in FIG. 6.

Figure 6:
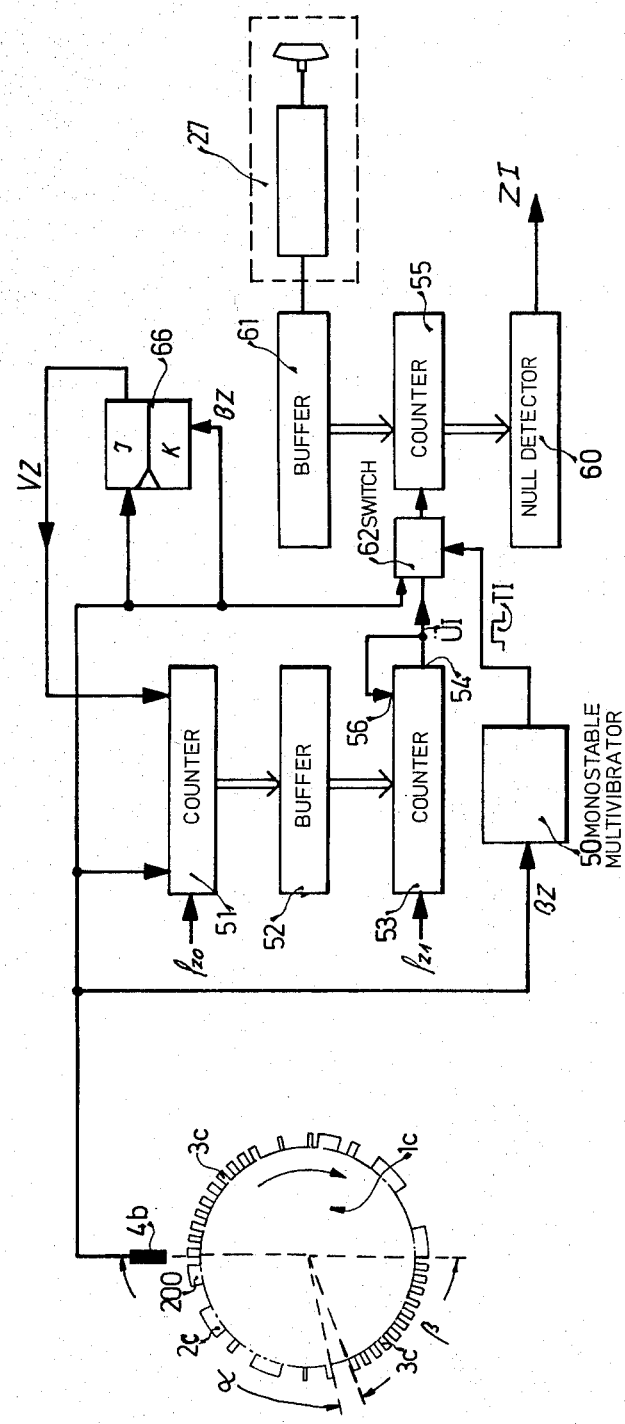
FIG. 6 is a schematic diagram of the circuit for evaluating the data sensed from the data carrier of FIG. 5.

As shown in FIG. 6, monostable multivibrator 50 is connected to the output of sensor 4b. The output of sensor 4b is also applied to the input of a first slope counter 51. Counter 51 is enabled by the leading edge of the first pulse from sensor 4b and blocked by the trailing edge. A counting input of counter 51 receives a constant frequency pulse sequence $f_{Z0}$. A buffer storage 52 is connected to the output of counter 51. The output of buffer 52 is connected to the preset inputs of a counter 53. The counting input of counter 53 receives a constant frequency pulse sequence $f_{Z1}$. The frequency $f_{Z1}$ greatly exceeds the frequency $f_{Z0}$. A carry pulse U1 generated by counter 53 at output 54 is applied to the reset input 56 of counter 53 and to one input of a gate 62 whose second and third inputs are connected, respectively, to the output of sensor 4b and the output of monostable multivibrator 50. The output of gate 62 is connected to the input of output counter 55. The outputs of output counter 55 are applied to the inputs of a zero detector 60. Preset inputs of counter 55 are connected to the outputs of a buffer storage 61 which, in turn, is connected to the output of operator parameter sensor 27.

OPERATION

Figure 7:
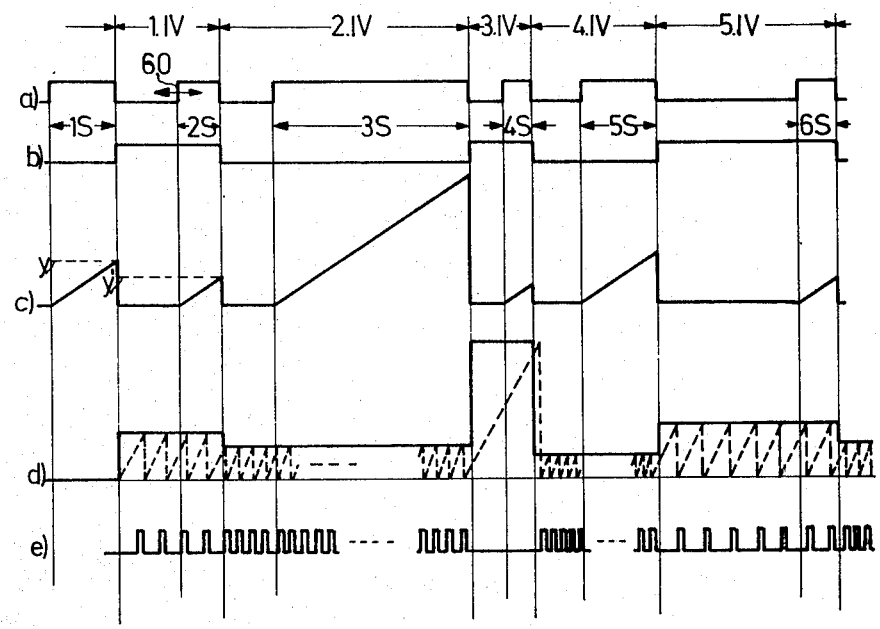
FIG. 7 shows signal variations as a function of time in the circuit of FIG. 6.

Monostable multivibrator 50 responds to the leading edge of the first pulse, 200, sensed by sensor 4b in the data storage region. Again, the first pulse can either be a pulse of higher than usual magnitude, or, alternatively, monostable multivibrator 50 could be set by a pulse furnished by another sensor and positioned opposite tooth 200 on another track. Again, the predetermined fixed scanning interval is the time in which monostable multivibrator remains in the metastable state. The leading edge of the pulse which set monostable multivibrator 50 also enables counter 51. Counter 51 counts for the length of segment 200, that is until it is blocked by its trailing edge. The count on counter 51 is thus proportional to the length of segment 200 or, in other words, to the pulse width of the first pulse furnished by sensor 4b. The length of segment 200 is so chosen that the count on counter 51 will be indicative of the reciprocal of the slope of the characteristic curve. This is illustrated in FIG. 7. FIG. 7a shows the segments in the data storage region 2c or the pulse sequence generated by sensor 4b in dependence on the segments. The segments are numbered consecutively "1S", "2S" etc. The periods of the pulse sequence of line 7a are indicated by "1 IV", "2 IV" etc., where the period is the time interval between corresponding portions (e.g. trailing edges) of consecutive pulses. The corresponding counts on counter 51 are shown in line 7c. The count on the counter increases with increasing time until the trailing edge of the pulse 1S, at which time the count of y has been reached. At the time of the trailing edge of pulse 1S, count y is transferred to buffer storage 52. The contents of buffer storage 52 set counter 53. Counter 53 is then counted down at frequency $f_{Z1}$. When a zero count is reached, carry pulse U1 is generated which causes the count in buffer storage 52 to be reapplied to the set inputs of counter 53. The carry pulse is also transferred through gate 62 to output counter 55. Since frequency $f_{Z1}$ greatly exceeds frequency $f_{Z0}$, a relatively large number of carry pulses U1 will be generated during the time gate 62 is kept conductive by the pulse from monostable multivibrator 50. The carry pulses are shown in line 7e. The number of carry pulses will be inversely proportional to the count on counter 51, since it takes a longer time to count down a higher number. The number of carry pulses, that is the number of pulses shown in line 7e, is therefore directly proportional to the slope of the characteristic curve. The leading edge of segment 2S reenables counter 51. This time the count on the counter increases to a number less than y, since segment 2S is shorter than segment 1S. The second count in counter 51 takes place while the repetitive countdowns in counter 53 continue, since segment 2S lies within interval 1 IV. Since, when designing this system, a free choice of interval and of segment length is available, the curve of FIG. 1 can be matched both as to slope and as to the range over which a particular slope is maintained.

The lower count, y' achieved during the second segment 28 is counted out throughout the whole second interval 2 IV. Counter 51 is reset by the trailing edge of each segment, its count being simultaneously transferred to buffer storage 52. This process continues during the whole time that gate 62 is kept in the conductive state by the output pulse from monostable multivibrator 50. During this time, namely the predetermined fixed scanning time, the carry pulses from counter 53 are applied to the counting input of output counter 55. The count on counter 55 therefore increases continuously during the scanning time. The number of segments covered during the scanning time varies as a function of engine speed. For lower engine speeds, less segments will be scanned during the time monostable multivibrator is in the metastable state; the opposite is true at higher engine speeds. The count on counter 55 is a measure of the angle at which ignition is to take place at the then-present engine speed.

At the end of the scanning interval, that is when monostable multivibrator 50 returns to the stable state, the transmission of data pulses to counter 55 is stopped. Gate 62 switches from being conductive for the carry pulses to being conductive for the count pulses applied at its second input. The count pulses furnished, for example, by sensor 4b passed through gate 62 to counter 55 unitl its limiting value, for example, zero, is reached. Zero detector 60 then furnishes the ignition pulse ZI when the count of zero is reached on counter 55.

This second method is then realized by the only use of the specific sequence as shown in FIG. 7a. By the sequence of FIG. 7a, each interval is assigned a sign opposite the preceding interval, i.e. interval 1 is positive, interval 2 is negative, interval 3 positive, etc. The alternating sign required can be generated by the same JK flip-flop 66 shown in FIG. 6 being then directly connected to sensor 4b. The flip-flop is triggered by the negative going edge of the signal from sensor 4b, so that the "1" output changes from the J to the K output for each trailing edge. The signal at the J output of flip-flop 66 is applied to the direction input of counter 51, that is counter 51 counts upwards when the J output is a "1" signal and downwards when the J output is a "0" signal. At the start of the operation flip-flop 66 is switched to a predetermined state by application of a reference signal BZ.

In the embodiment of FIG. 6, individual segments 2c in the data storage region do not represent counting pulses. Rather the length of the segments is indicative of the slope of the characteristic curve, while the interval between corresponding parts of sequential segments indicate the length of time the slope remains constant. It should also be noted that the count in counter 51 is inversely proportional to speed since a particular segment will pass by the sensor more rapidly at higher engine speeds and the frequency $f_{Z0}$ at which counting pulses are applied to counter 51 remains constant. However, the subsequent interval time (e.g. 1 IV) also decreases so that fewer carry pulses U1 are furnished by counter 53 at higher engine speeds. The number of pulses U1 is thus independent of engine speed and varies only as a function of the number of segments covered during the predetermined fixed scanning time. Variation as a function of speed of the contents of counter 55 results from the fact that the number of segments covered during the time that monostable multivibrator 50 is in the metastable state, that is during the scanning time, is directly proportional to engine speed.

The next embodiments to be described each make use of a reference segment to which all segments required for recreating the characteristic curve are referred. The reference segment may be on a separate track or may be on the same track as the segments denoting the parameters of the characteristic curve. In these embodiments there is no need for the counting pulse sequence. The characteristic curves are reconstructed by use of the reference segment and one or more interpolation tracks for segments which signify the slope and the constant slope intervals. In order to evaluate the information in the interpolation tracks, the segments in the interpolation tracks are related to the reference segment either on a time or on an angular basis.

Figure 8:
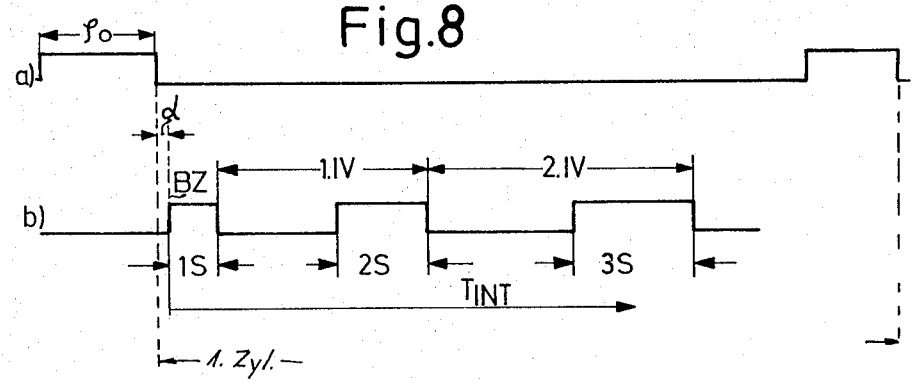
FIG. 8 illustrates a data carrier utilizing a reference segment.

A first embodiment utilizing a reference segment will be explained with reference to FIG. 8. In FIG. 8 a track a has the reference segment, while track b has the interpolation segments. The segments can be projections on the circumference of a disk. Line a shows the reference track with reference segments $\phi_O$. Reference segment $\phi_O$ is scanned before the information on the interpolation track is scanned. The trailing edge of reference segment $\phi_O$ is utilized as the reference point for the initiation of ignition. Track b includes the interpolation data including the slope and the interval data which is required for reconstructing the characteristic curve. The characteristic curve is reconstructed up to the point at which, for the then-present speed, the particular process (e.g. ignition) is to be initiated. At this point a pulse initiating the process is generated. The evaluation of the characteristic curve from the data on the interpolation track according to FIG. 8b takes place during the predetermined fixed scanning time which starts at the time of the trailing edge of the reference segment. At the end of the scanning time, a particular interval difference (e.g. 2IV in FIG. 8b) has been reached and the characteristic curve has been reconstructed up to this region. The value of the dependent variable at this point corresponds to the count on an output counter.

The above concepts will be explained in greater detail with reference to FIG. 9. The general approach, however, is the same as it was for previous embodiments. Specifically, the speed dependency of the scanning of the segments is cancelled out by counting down during intervals which are also speed dependent. The evaluation with respect to speed results only from the fact that the number of segments scanned during the predetermined scanning time varies as a function of speed.

As mentioned above, the reference track in FIG. 8 contains the reference segment $\phi_O$ which extends over a predetermined reference angle. If the characteristic curve to be reconstructed contains only straight line segments, then the interpolation track of FIG. 8b must store the data for the slopes, the constant slope intervals and, if required, initial values. A value to be computed depends on the relationship of the length of the associated segment on the interpolation track to the length of reference $\phi_O$. To carry out the evaluation, the value of the slope for the next following constant slope interval must be available. An angular shift therefore exists between the computation of the slope and the constant slope interval during which this value will be utilized. The starting point for the predetermined fixed scanning time is determined by the leading edge of the first interpolation segment following the trailing edge of the reference segment.

Reference segment $\phi_O$ is utilized to generate counting pulses, that is pulses at constant angular intervals whose frequency varies as a function of engine speed. These pulses are used in computing the final value from the data contained in the interpolation segments and intervals.

The circuit of FIG. 9 includes a logic stage 70 having a first input receiving the pulses generated by scanning of the reference track and a second input b for receiving information scanned from the interpolation track. Stage 70 furnishes an electrical pulse having a pulse width $\phi'_O$ corresponding to the length of reference segment $\phi_O$ to a gate 72. During this time, gate 72 is conductive and allows transmission of a pulse sequence of frequency $f_{T1}$ to a counter 73. Since the pulse width of pulse $\phi'_O$ varies inversely with engine speed, the number of pulses received by counter 73 at the end of time $\phi_O'$ is also inversely proportional to engine speed. The length of reference segment $\phi_O$ depends upon the multiplication factor required for counting down the ignition angle. The trailing edge of pulse $\phi'_O$ is the reference time for the actual ignition angle, while the number of $\phi_O$ segments corresponds to the number of cylinder pairs in the internal combustion engine.

At the time of the trailing edge of pulse $\phi'_O$, the count on counter 73 is transferred to division counter 75. Specifically, a set enable pulse from logic circuit 70 is transferred through line 77 to the set enable input of counter 75. A pulse over line 78 resets counter 73 immediately prior to the start of the next reference interval $\phi'_O$. In the time interval between two $\phi_O$ segments, counter 75 counts down in accordance with pulses of a frequency $fT2$ which is much higher than the frequency $fT1$. When the count on counter 75 reaches zero, null detector 80 furnishes a zero detect output signal. The zero detect output signal supplied to logic circuit 70 causes a pulse to be generated on line 77 which resets counter 75 to the count on counter 73. The count down on counter 75 then repeats. The zero detect output signals furnish by zero detector 80 constitute a sequence of counting pulses as defined in the previous embodiments, that is pulses each signifying a predetermined angular increment and having a pulse repetition frequency which varies as a function of engine speed.

The counting pulses are applied to the counting input of slope counter 82. Slope counter 82 is enabled during each segment in FIG. 8b, that is for the time denoted by 1S, 2S, 3S etc. At the trailing edge of the pulses generated by the scanning of each segment, the number stored in counter 82 is transferred to buffer storage 84. The same pulse that causes the transfer into storage 84 also resets counter 82. The contents of storage 84 are multiplied by the counting pulses (each of which represents an angle increment) in multiplier 86. The sequence of pulses at the output of multiplier 86, denoted by MUI-1 in FIG. 9, is applied to output counter 87. Counter 87 is enabled only during the predetermined fixed scanning time $T_{INT}$ by a signal applied at an enable input 88. The contents of counter 87 are transferred to an ignition angle counter 90, for example in response to the trailing edge of the subsequent $\phi'_O$ pulse. Counter 90 then counts down in response to the counting pulses applied at its counting input. When zero detector 91 detects a zero count on counter 90, the pulse ZI which initiates the ignition process is generated. As in previous embodiments, the count on output counter 87 can be initially set to a value determined by an operating parameter transducer 27.

The sign of the slope can be taken into consideratiion in the embodiment in FIG. 9 as it was in previous embodiments. Specifically, counter 87 can be switched to count in the downward direction when required.

Since, as previously mentioned, the count on counter 73 for a given reference segment varies inversely as engine speed, a very high count on the count is indicative of a very low engine speed. If a predetermined count on counter 73 is reached indicating an engine speed substantially below idling speed, a decoder 96 will furnish a signal which causes an interruption of the quiescent current in the ignition coils.

Figure 10:
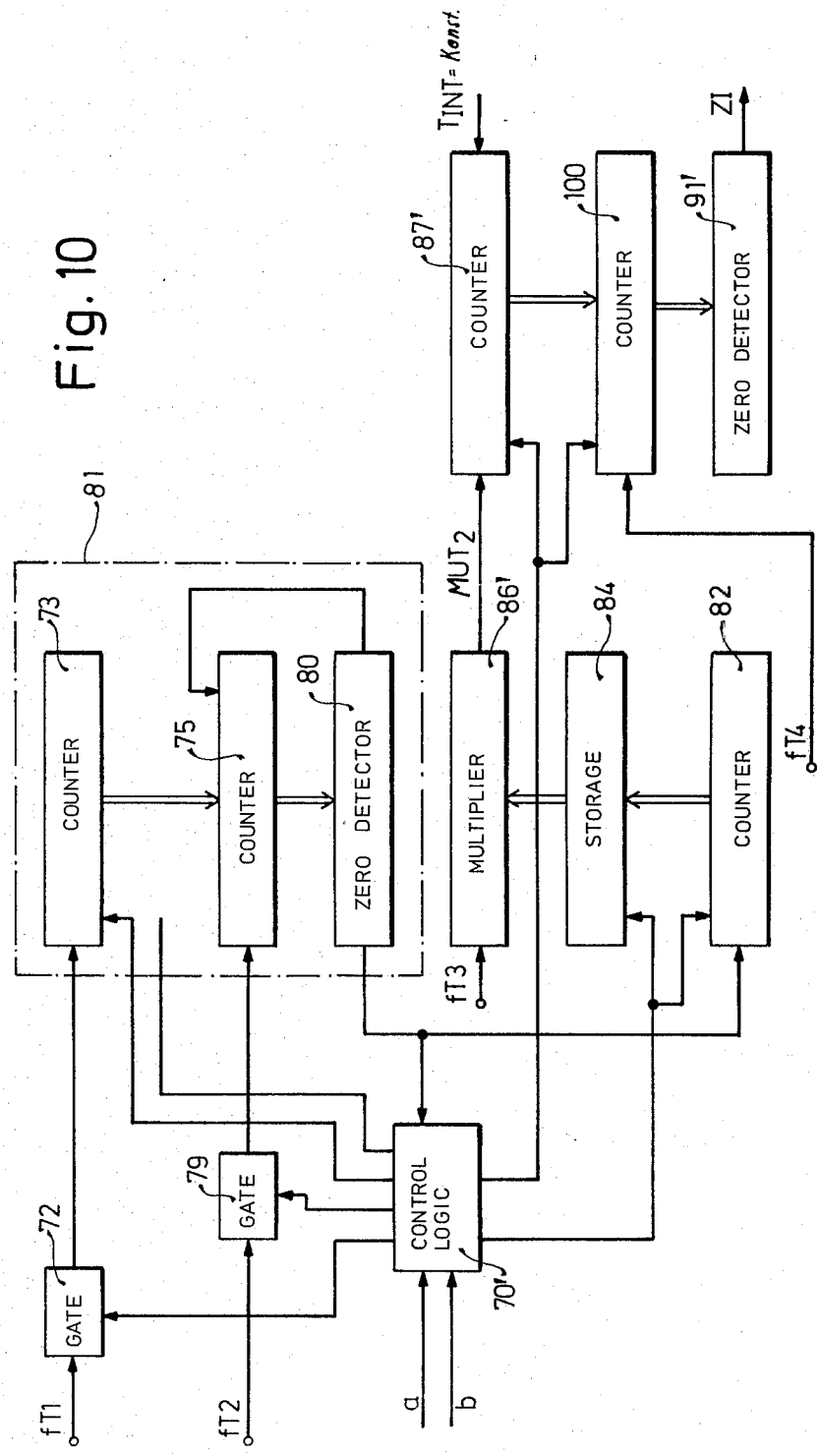
FIG. 10 shows the system required to generate a control signal at a time signified by the data stored in data carrier of FIG. 8.

The circuit of FIG. 9 operates to initiate spark ignition at an ignition angle, that is the interpolation of the ignition angle takes place as a function of engine speed n. The type of coding used in FIG. 8a can also be applied to a system wherein the ignition signal is furnished as a predetermined ignition time rather than ignition angle. This type of system is shown in FIG. 10. Corresponding elements in FIGS. 9 and 10 have the same reference numerals. As in FIG. 9, stage 81 of FIG. 10 furnishes a sequence of counting pulses, that is pulses each of which represent an angle increment, the pulse repetition rate being a function of engine speed. These pulses are counted in slope counter 82 as in FIG. 9. However, in multiplier 86' of FIG. 10 the slope stored in buffer storage 84 is multiplied by a pulse sequence fT3 which has a pulse repetition rate which is independent of engine speed. The resulting output of multiplier 86, a pulse sequence denoted by MUT2 is summed up in an ignition time counter 87' over the predetermined fixed scanning time $T_{INT}$. The count on counter 87' signifies the desired ignition time. The count-down in counter 100 also takes place by means of a speed-independent pulse sequence, denoted by fT4. When the count on counter 100 is 0, zero detector 91' furnishes the ignition signal. The output pulses of multiplier 86' of FIG. 10 each represent an ignition time increment which, after summing over a predetermined scanning time and count down at a fixed frequency cause the generation of the ignition signal at the desired ignition time.

Figure 11:
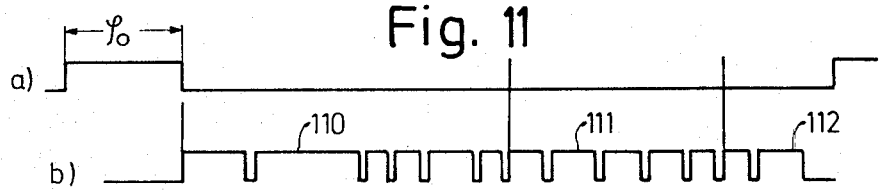
FIG. 11 illustrates the data storage region of a data carrier corresponding to a further embodiment of the present invention.

A different type of coding is shown in FIG. 11. The reference segment $\phi_O$ is still on a separate reference track. However, the interpolation track is divided into separate blocks. As shown in FIG. 11, block 110 stores data signifying the constant slope intervals, block 111 stores data signifying the slope and a third block 112 stores data signifying the sign of the slope. The reference $\phi_O$ could also be positioned on the interpolation track b. The reference track would then have to have a mark which indicates a particular reference position, for example the top dead center. In order to minimize the room required for storing the data, each block need be represented only once along the circumference of the disk. The disk can, for example be so divided that, in the region of the first cylinder the data signifying the slopes and the constant slope intervals is stored, in the region of the second cylinder the required signs are stored and in the region of the third cylinder the initial values are stored, all storages being in the form of raised segments. Depending upon the arrangement of the segments, read-write storages may have to be provided so that the parameters are always available.

Figure 12:
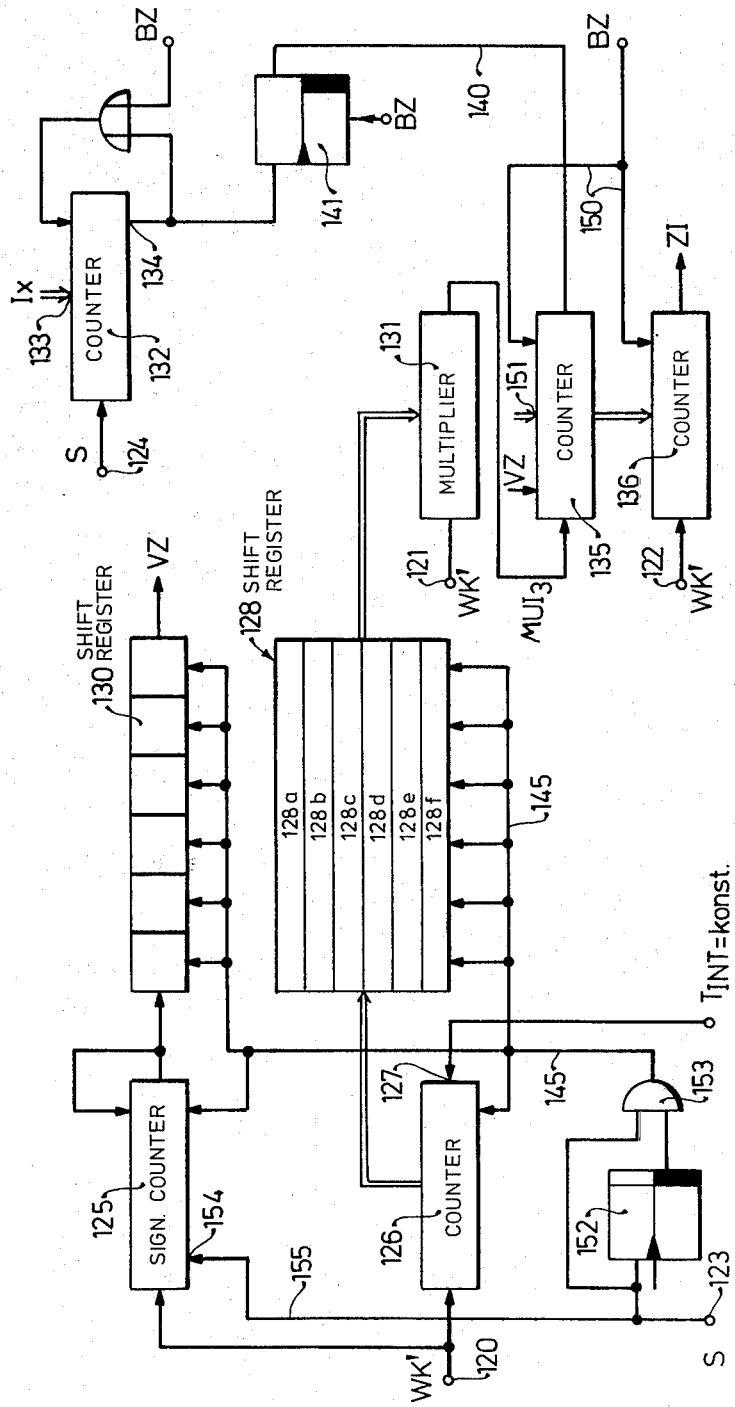
FIG. 12 is a schematic diagram illustrating a circuit for evaluating the data stored in the data carrier of FIG. 11.

A circuit for generating an ignition initiating signal in response to the data stored as shown in FIG. 11, is shown in FIG. 12. Specifically, FIG. 12 shows circuit blocks to be used in addition to some of the blocks already shown in FIGS. 9 and 10. For example, the counting pulses WK' generated in stage 81 of FIGS. 9 and 10 are applied to terminals 120, 121, and 122 of FIG. 12. Data signals from track 11b are applied to input terminals 123 and 124. The circuit of FIG. 12 includes a sign counter 125 which determines the sign of the slope as a function of the keying ratio. The counting pulses WK' are applied to the input of counter 125, the counter being reset by the positive edge of each data pulse applied at terminal 123. When the signal at terminal 123 is a "1" signal counter 125 counts upwards; for a "0" signal at terminal 123 counter 125 counts down. A second counter 126 also receives the counting pulses WK' at its counting input. It, too, is reset for each leading edge of the signals applied at terminal 123. Counter 126 counts upward only and counts only during the predetermined fixed scanning time $T_{INT}$. This signal is applied to the enable input 127 of counter 126.

Counter 126 cooperates with a shift register 128. Shift register 128 comprises a plurality of parallel shift registers 128a to 128f, the number being equal to the number of bits in counter 126. The number of stages in each shift register 128a–128f is equal to the number of intervals in that part of the data carrier of FIG. 11 which is assigned to intervals. For each positive going edge of the signal applied at terminal 123, the output of counter 126 is transferred to the first stage of all shift registers and the information in any given shift register stage is shifted to the next higher stage. The process continues until the last place in each shift register contains data corresponding to the length of the first interval.

A further shift register 130 is provided. The number of stages in shift register 130 is equal to the number of intervals required for the signs of the individual slopes. Shifting through shift register 130 takes place under control of the leading edges of the signals applied at terminal 123.

A multiplier 131, which is a series multiplier, multiplies the data in each stage of shift register 128 by the counting pulses applied at a terminal 121 thereby generating the product of the interval difference multiplied by the slope each time. The output of multiplier 131 is a pulse sequence having the form:

MUI₃ = WK' × Content of Shift Register Stage 128i/Normalizing Factor.

The multiplier 131 can be a TTL building block having the number NS 7497 of Texas Instruments. An interval number counter 132 is provided for controlling the multiplication and summation processes. Counter 132 cyclically counts the individual interval numbers. For synchronization, it is preset with the number of intervals in response to a reference mark BZ. Carry pulses at output 134 also cause the counter to be preset to the same number. The output pulses MUI₃ of multiplier 131 are applied to an output counter 135 which forms the total sum of the products of the interval difference multiplied by the slope. Output counter 135 is set to its starting value by reference mark BZ. An ignition angle counter 136 is connected to the output of output counter 135. As was previously discussed with reference to FIGS. 9 and 10, the count in counter 136 is counted down by the counting pulses WK' until, at a predetermined count, the ignition pulse ZI is furnished.

OPERATION

Figure 13:
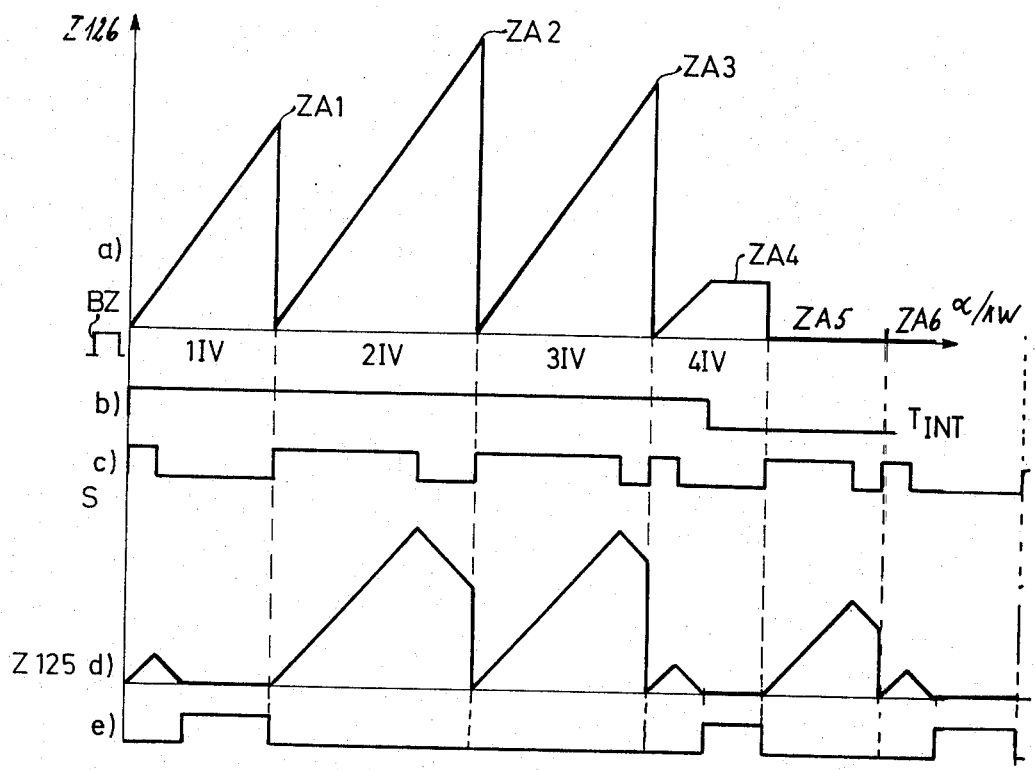
FIG. 13 shows signal variations at different points in the system of FIG. 12.

Upon receipt of the reference mark, a new cycle for determining the individual interval differences as well as the sign by counters 125 and 126 is initiated. The operation will be described with reference to FIG. 13. FIG. 13b shows the predetermined constant scanning time $T_{INT}$. This enables counter 126. FIG. 13c shows the pulses generated by scanning of the segments of block 110 of FIG. 11. This signal is the signal denoted by S and applied to inputs 123 and 124 of the circuit of FIG. 12. Sensing of reference mark BZ also causes a loading of counter 132 with the number corresponding to the number of intervals in block 110. Further, output counter 135 is preset to a predetermined starting angle which, for example, corresponds to the then-present load of the internal combustion engine. The new cycle starts at the start of the predetermined fixed scanning time $T_{INT}$, but counter 135 at first remains at its initial count, since flip-flop 141 is reset by reference mark BZ and line 140 does not carry a signal enabling counter 135 until the first carry pulses received from counter 132. This is important since the data concerning the intervals must first be stored in shift registers 128 before the output of multiplier 131 becomes effective at the input of counter 135.

Over the time $T_{INT}$, the count on counter 126 changes as shown in FIG. 13a. The count increases until the leading edge of the pulse derived from scanning the next subsequent segment resets the counter. At this point, count ZA1 is transferred to the first stages of shift registers 128a–128f. At the next leading edge, count ZA2 is transferred from counter 126 to the lowest stage of shift registers 128a–128f, while the count previously stored in this lower stage is transferred to the next higher stage. Since the counting pulses applied to counter 126 are pulses spaced at equal angular increments, the count on counter 126 (as well as that on counter 125) increases as a function of angle scanned, independent of the speed of the engine. The counting and shifting processes end at the end of the predetermined fixed scanning time. At this time the count on counter 126 is count ZA4, rather than the count that would have resulted had the full forth interval been covered. Different stages of shift registers 128a–128f have the following information at the end of the scanning time:

First (highest) stage=$ZA_1$; Second stage=$ZA_2$;
Third stage=$ZA_3$; Fourth stage=$ZA_4$;
Fifth stage=$ZA_5$=0; last stage=$AZ_6$=0.

At the end of $T_{INT}$ a carry pulse is generated by counter 132 and flip-flop 141 is set, thereby enabling counter 135. The multiplication is carried out for the duration of each interval, that is for time between consecutive positive edges of the signal S. In the example shown in FIG. 13, the multiplier output will be a zero after the forth shifting process.

The sign is derived from the output of counter 125 as illustrated in FIG. 13d. It will be remembered that counter 125 counts upwards when the signal at terminal 123 is a "1" signal and downwards when the signal at terminal 123 is a "0" signal. At the end of the first interval, the count on counter 125 is zero. At the end of the second, third and fifth intervals it is a finite number and at the end of the fourth and sixth interval it is also zero. In accordance with the system used in this embodiment, the slope of intervals 1, 4, and 6 will be a positive slope, that for intervals 2, 3, and 5 a negative slope. If the counter, at the end of the interval, has a finite number other than zero, a "1" signal is shifted into shift register 130 with the next positive going edge of the signal at terminal 123. Shift register 130 also has as many stages as there are intervals, that is the number of stages in shift register 130 is equal to the number of stages in shift registers 128. A sign signal, VZ is available at the output of shift register 130 simultaneously with the interval information in the corresponding stage of shift register 128. Signal VZ is applied to counter 135 causing the counter to count up for positive slopes and down for negative slopes.

The required shift, reset and transfer pulses are derived from signal sequence S, by means of a flip-flop 152 and an AND gate 153. It will be noted that in this embodiment the sign information was derived from the keying ratio of the segments (or the pulses resulting from scanning of the segments) in block 110 of FIG. 11.

Figure 14:
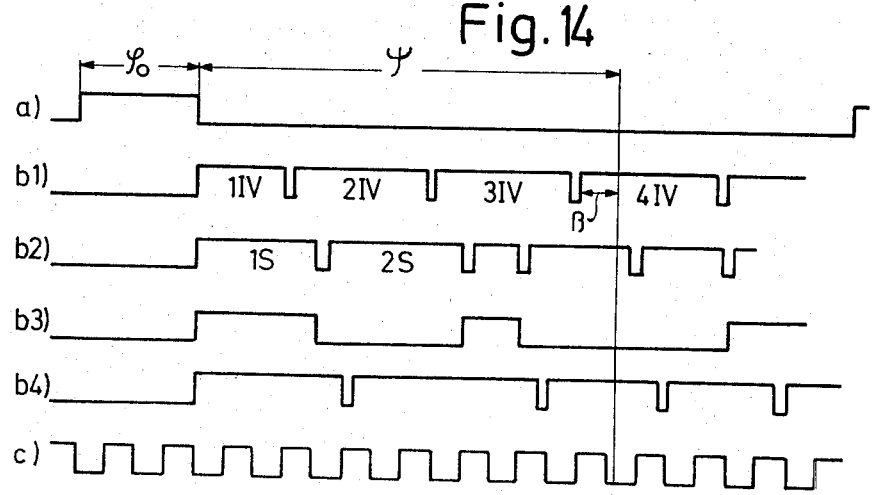
FIG. 14 shows a still further embodiment of data storage in accordance with the present invention.

A further embodiment of the data carrier which may be used as part of the present invention is shown in FIG. 14. Here a plurality of tracks is used to generate the required data. The main track 13a contains the reference segment as in previous embodiments. Track b1 carries the data regarding the length of the successive intervals 1IV, 2IV, etc.; each interval is measured as the distance between corresponding consecutive edges. This track is used to develop the interval addresses and the distance to the end of the interval which is required for interpolation. Track b2 contains the slope values 1S, 2S etc. The position of a slope segment is independent of the position of the associated segment for the interval. Two further tracks b3 and b4 allow storing of initial values and sign. The segments for the sign can coincide with those for the slopes. Otherwise slope values for a given interval will be the same, but will have a different sign. In the embodiment shown in FIG. 14, the sign changes only at the limits of the slopes. A track 14c is provided for furnishing segments whose scanning will result in counting signals, that is signals spaced at equal angular increments. The interpolation process starts with the trailing edge of segment $\phi_O$ on main track a and takes place throughout the predetermined fixed scanning time $T_{INT}$. The angle scanned during the scanning time depends on the engine speed. In FIG. 14, time $T_{INT}$ ends after an interval $\phi$ at an interval address for interval 4. The other tracks furnish the remaining parameters to this address. Tracks may be saved if, for example, the sign information is derived from the keying ratio in a particular track, for example the slope track. This type of computation has been shown relative to FIG. 11, where the interval keying rate was utilized to derive the sign information. Use of adjacent pulse edges for deriving the information for a particular parameter is also possible. No explicit circuit for evaluating the data from the data carrier in FIG. 14 is shown. A number of storage systems for the individual code information on the tracks as well as address multiplexer circuits are required, which control the storages in accordance with the sensed signals. When the counting pulses are derived from track 14c it is of course not necessary to furnish circuit 81 to generate these pulses.

Various changes and modifications may be made with the scope of the inventive concept.

I claim:

1. In an internal combustion engine having a shaft rotating through sequential cycles each starting at a reference point, over a speed range corresponding to a predetermined range of engine speed, a system for generating a control signal at a control position relative to said reference point, said control position varying as a function of engine speed, comprising mark carrying means (1a, 1b, 1c) and mark sensing means (4) moving relative to each other at a speed corresponding to the then-present engine speed, said mark carrying means having a data storage region having data markings (20) representing, in a predetermined code, the values of constants required to compute said control position, said mark carrying means further comprising a sequence of counting markings (30) spaced at predetermined angular increments therealong, said mark sensing means comprising means for sensing said data markings and said counting markings and furnishing corresponding data and counting signals, respectively; and computing means (10) connected to said mark sensing means for computing said control position at least in part as a function of said data signals and for generating said control signal when said shaft is in said control position relative to said reference point, said computing means comprising means for summing at least selected ones of said counting signals and said data signals and furnishing said control signal when the so-formed sum reaches a predetermined sum.

2. Apparatus as set forth in claim 1, wherein said summing means comprises counting means; and wherein said counting means furnishes said control signal when the count thereon reaches a predetermined control count.

3. In an internal combustion engine having a shaft rotating through sequential cycles each starting at a reference point, over a speed range corresponding to a predetermined range of engine speed, a system for generating a control signal at a control position relative to said reference point, said control position varying as a function of engine speed in accordance with a characteristic curve having a plurality of break points (no, n, ...) each indicative of a change of slope, comprising mark carrying means (1a, 1b, 1c) and mark sensing means (4) moving relative to each other at a speed corresponding to the then-present engine speed, said mark carrying means having a data storage region having data markings representing, in a predetermined code, the values of constants required to compute said control position, said mark sensing means comprising means for sensing said data markings and furnishing corresponding data signals;

timing means (23, 10a) connected to said mark sensing means for furnishing a timing signal over a predetermined fixed scanning time starting at said reference point;

computing means (10) connected to said mark sensing means for computing said control position at least in part as a function of said data signals and for generating said control signal when said shaft is in said control position relative to said reference point; and logic circuit means (25) connected to said timing means and said computing means for transferring said data signals from said mark sensing means to said computing means under control of said timing signal.

4. Apparatus as set forth in claim 3, further comprising counting signal furnishing means for furnishing a sequence of counting signals each signifying a position increment;

wherein said computing means comprises means for summing signals applied thereto;

further comprising means for applying said counting signals and said data signals transferred by said logic circuit means to said summing means.

5. Apparatus as set forth in claim 4, wherein said summing means comprises counting means.

6. In an internal combustion engine having a shaft rotating through sequential cycles each starting at a reference point, over a speed range corresponding to a predetermined range of engine speed, a system for generating a control signal at a control position relative to said reference point in each of said cycles, said control position varying as a function of engine speed, comprising mark carrying means (1a, 1b, 1c) and mark sensing means (4) rotating relative to each other at a speed corresponding to the then-present engine speed, said mark carrying means having a data storage region having data markings representing, in a predetermined code, the values of constants required to compute said control position, said mark sensing means comprising means for sensing said data markings and furnishing corresponding mark signals;

computing means (10) connected to said mark sensing means for computing said control position at least in part as a function of said data signals and for generating said control signal when said shaft is in said control position relative to said reference point;

further comprising timing means (23, 10a) connected to said mark sensing means for furnishing a timing signal over a predetermined fixed scanning time starting at said reference point;

wherein said computing means comprises logic circuit means (25) for controlling the transfer of said data signals from said mark sensing means to said computing means in dependence on said timing signal;

wherein said mark carrying means comprises a disk rotating with said shaft, said disk having a track along the circumference thereof;

wherein said data storage region extends a predetermined data distance along said track;

wherein said logic circuit means transmits said data signals to said computing means throughout the duration of said timing signal, whereby data signals transmitted to said computing means correspond to markings along a speed-varying length of said track;

wherein said computing means comprises counting means for furnishing a data counting signal in response to said data signals;

further comprising counting signal furnishing means connected to said counting means, for furnishing a sequence of counting signals each signifying a position increment and applying said counting signals to said counting means;

and wherein said counting means comprises means for counting said counting signals and furnishing said control signal when the count on said counting means reaches a predetermined control count.

7. In an internal combustion engine having a shaft rotating through sequential cycles each starting at a reference point, over a speed range corresponding to a predetermined range of engine speed, a system for generating a control signal at a control position relative to said reference point in each of said cycles, said control position varying as a function of engine speed, comprising mark carrying means (1a, 1b, 1c) and mark sensing means (4) rotating relative to each other at a speed corresponding to the then-present engine speed, said mark carrying means having a data storage region having data markings representing, in a predetermined code, the values of constants required to compute said control position, said mark sensing means comprising means for sensing said data markings and furnishing corresponding mark signals;

computing means (10) connected to said mark sensing means for computing said control position at least in part as a function of said data signals and for generating said control signal when said shaft is in said control position relative to said reference point;

further comprising timing means (23, 10a) connected to said mark sensing means for furnishing a timing signal over a predetermined fixed scanning time starting at said reference point;

wherein said computing means comprises logic circuit means (25) for controlling the transfer of said data signals from said mark sensing means to said computing means in dependence on said timing signal;

wherein said mark carrying means has a plurality of substantially rectangular segments arranged along the direction of rotation within said data storage region;

wherein said mark sensing means comprises means for sensing said segments and furnishing a sequence of data pulses each having a pulse width corresponding to the length of a corresponding one of said segments;

wherein said computing means comprises means (FIG. 12) for computing said control position in dependence upon said width of said data pulses and the time interval between corresponding parts of sequential ones of said data pulses;

further comprising counting signal furnishing means for furnishing counting pulses each signifying a predetermined angular increment of rotation, and sign counting means (125) for counting said counting pulses in an upward direction in the presence of and in a downward direction in the absence of one of said data pulses, resetting in response to the leading edge of each of said data pulses and furnishing positive or negative sign signal in dependence on the count on said sign counting means immediately preceding said resetting.

8. Apparatus as set forth in claim 5, wherein said mark carrying means comprises a disk rotating with said shaft, said disk having a track along the circumferential direction thereof;

wherein said data storage region extends a predetermined data distance along said track;

and wherein said logic circuit means transmits said data signals to said computing means throughout the duration of said timing signal, whereby data signals transmitted to said computing means correspond to markings along a speed-varying length of said track.

9. Apparatus as set forth in claim 3, wherein said mark carrying means has a plurality of substantially parallel tracks rotating relative to said data sensing means, said data storage region extending a predetermined data distance along each of said tracks;

wherein said mark sensing means comprises means for sensing data markings in corresponding positions in each of said tracks substantially simultaneously; and wherein said logic circuit means comprises means for transmitting data signals to said computing means at the end of said timing signal, whereby the position of said sensing means relative to said data carrying means when said data signals are transmitted to said computing means changes as a function of speed.

10. Apparatus as set forth in claim 5, further comprising operating parameter sensor means (27) for sensing the value of a predetermined operating parameter of said engine, furnishing a corresponding parameter signal, and presetting said counting means to a preset count corresponding to said parameter signal, whereby the position of said control position relative to said reference point varies in part as a function of said value of said predetermined operating parameter.

11. Apparatus as set forth in claim 8, wherein said counting signal furnishing means comprises a sequence of counting markings (30) spaced at predetermined angular increments along said mark carrying means, said mark sensing means comprising means for sensing said counting markings and furnishing said counting signals in response to so-sensed markings.

12. Apparatus as set forth in claim 11, wherein said data markings comprise a seqeunce of segments of different lengths spaced at varying intervals in the direction of rotation of said data storage region;

wherein said mark sensing means comprises means for furnishing a sequence of data pulses each having a pulse width corresponding to the length of the corresponding one of said segments;

and wherein said logic circuit means further comprises means (51, 52, 53) for furnishing a plurality of speed independent pulses at a pulse repetition rate independent of speed and corresponding in number to the length of said data segments, and gating means (62) for transmitting said speed independent pulses to said counting means only during the duration of said timing signal.

13. Apparatus as set forth in claim 12, wherein said means for furnishing said speed independent pulses comprises a first counter (51) having an enable input connected to receive said data pulses and a counting input, means for applying a pulse sequence having a first predetermined pulse repetition rate to said counting input, a buffer storage (52) connected to said first counter for receiving the count on said first counter at the end of each of said data pulses, a second counter (53) having a preset input connected to said buffer storage, a counting input and a carry output for furnishing said speed independent pulses, and means for applying a second pulse sequence having a predetermined pulse repetition rate substantially higher than said first predetermined pulse repetition rate to said counting input of said second counter.

14. Apparatus as set forth in claim 13, wherein said counting means comprises an output counter having a counting input and a counting output for furnishing said control signal when the count on said output counter is a predetermined count;

and wherein said gating means comprises selector switch means for connecting said counting input of said output counter to said carry output of said second counter in the presence of said timing signal and for connecting said counting input of said output counter to said counting marking sensing means in the absence of said timing signal.

15. Apparatus as set forth in claim 12, wherein the characteristic curve of control position vs. speed is approximated by straight line segments, each having a predetermined slope, each extending over a predetermined associated speed range;

and wherein the length of each of said segments corresponds to the slope of a corresponding one of said straight lines;

and wherein said logic circuit means comprises means for furnishing a plurality of speed independent pulses at a pulse repetition frequency corresponding to the length of a corresponding one of said segments for time intervals corresponding to the interval between corresponding parts of sequential ones of said segments.

16. Apparatus as set forth in claim 8, wherein said counting signal furnishing means comprises a reference segment having a predetermined angular length on said mark carrying means, said sensing means comprising means for furnishing a main reference pulse having a pulse width corresponding to said length of said reference segment, means for furnishing a sequence of first reference pulses at a predetermined first reference repetition rate, reference counting means (73) having a counting input, a reset input and a plurality of counting outputs, reference gating means (72) having an enable input for receiving said main reference pulse, a data input for receiving said first reference pulse sequence and a transmission output connected to said counting input of said reference counting means, for applying first reference pulses to said counting input only during the duration of said main reference pulse, additional reference counting means (75) having preset inputs connected to said counting outputs of said reference counting means, a counting input and a counting output, means for presetting said additional reference counting means to the count on said reference counting means and resetting said reference counting means at the end of said main reference pulse, means (79) for applying a second reference pulse sequence at a second reference repetition rate substantially exceeding said first reference repetition rate to said counting input of said additional reference counting means, and means for again presetting said additional reference counting means and furnishing one of said counting pulses when the count on said additional reference counting means is a predetermined count.

17. Apparatus as set forth in claim 16, wherein said control position is a predetermined angular position relative to said reference point;
wherein the characteristic curve of ignition angle vs. engine speed is approximated by a plurality of straight lines each having a predetermined slope;
wherein said data markings comprise a plurality of segments each having a length corresponding to one of said slopes, said segments being spaced at varying intervals along the direction of rotation in said data storage region;
wherein said mark sensing means furnishes a plurality of data pulses each having a pulse width corresponding to the length of a corresponding one of said segments;
and wherein said computing means comprises slope counter means having an enable input for receiving said data pulses, a counting input for receiving said counting pulses, and a plurality of counting outputs, for furnishing a counting output signal corresponding to the number of counting pulses counted during each of said data pulses, slope storage means (84) connected to said counting outputs of said slope counter means for storing said slope counting signal at the end of each of said data pulses, multiplier means (86) connected to said additional reference counting means and said slope storage means, for multiplying said slope counting signal stored in said slope storage means by said counting pulses and furnishing a corresponding multiplier output pulse sequence,
output counter means (87) for counting the pulses in said multiplier output pulse sequence only throughout said predetermined fixed scanning time and furnishing an ignition angle counting signal at the end of said predetermined fixed scanning time, ignition angle counting means (90) having preset inputs connected to said output counter means and a counting input connected to said additional reference counting means, for counting in a predetermined direction from a preset number under control of said counting pulses and furnishing said control signal when the count thereon is a predetermined count, and means for presetting said ignition angle counter means to said ignition angle counting output signal at the end of said predetermined fixed scanning time.

18. Apparatus as set forth in claim 16, wherein said control position is a position in time relative to said reference point;
wherein said mark carrying means carries a plurality of data segments each having a predetermined length, spaced at predetermined intervals in the direction of rotation on said data storage region;
wherein said mark sensing means comprises means for furnishing data pulses each having a pulse width corresponding to the length of a corresponding one of said segments;
and wherein said computing means comprises slope counter means for counting said counting pulses during each of said data pulses and furnishing a corresponding slope counter output signal, storage means for storing the slope counter output signal at the end of each of said data pulses thereby furnishing a stored slope counter signal, means for furnishing a sequence of multiplier pulses at a predetermined multiplier pulse repetition rate, multiplier means for multiplying said stored slope counter output signal by said pulses in said sequence of multiplier pulses and furnishing a corresponding multiplier output signal sequence, ignition time counting means (87') for counting signals in said multiplier output signal sequence during said predetermined fixed scanning time only and furnishing an ignition time output signal at the end of said predetermined fixed scanning time, means for furnishing a timing pulse sequence at a predetermined timing pulse repetition rate, and output counting means adapted to be preset to said ignition time output signal for counting pulses in said timing pulse sequence from a preset count corresponding to said ignition time output signal and furnishing said control signal when the count thereon reaches a predetermined count.

19. Apparatus as set forth in claim 3, wherein said mark carrying means has a plurality of substantially rectangular segments arranged along the direction of movement within said data storage region;
wherein said mark sensing means comprises means for sensing said segments and furnishing a sequence of data pulses each having a pulse width corresponding to the length of a corresponding one of said segments;
and wherein said computing means comprises means (FIG. 12) for computing said control position in dependence upon said width of said data pulses and the time interval between corresponding parts of sequential ones of said data pulses.

20. Apparatus as set forth in claim 7, further comprising sign shift register means (130) for receiving each of said sign signals and shifting said sign signals through said sign shift register in response to said leading edges of said data pulses.

21. Apparatus as set forth in claim 20, further comprising interval counter means (126) for counting the number of counting pulses occuring during each sequential interval between leading edges of said data pulses and furnishing corresponding interval output signals; and enabling means for enabling said interval counting means only throughout said predetermined fixed scanning time.

22. Apparatus as set forth in claim 21, further comprising a plurality of second shift registers (128) corresponding in number to the number of bits in said interval output signal, means for applying said interval output signal to the first stage in each of said second shift registers in response to the leading edge of the first of said data pulses in said predetermined fixed scanning time, and means for shifting said interval output signal to the next higher stage in each of said second shift registers in response to the leading edge of each of said data pulses.

* * * * *